United States Patent [19]

Fouassier et al.

[11] Patent Number: 5,124,564
[45] Date of Patent: Jun. 23, 1992

[54] METHOD FOR RECORDING AND REPRODUCING A RADIATION IMAGE, APPARATUS USING SAID METHOD, PANEL FOR STORING A RADIATION IMAGE AND PHOTOSTIMULABLE PHOSPHORS

[75] Inventors: Claude Fouassier, Gradignan, France; Romano Morlotti, Ferrania, Italy

[73] Assignee: Minnesota Mining and Manufacturing Company, St. Paul, Minn.

[21] Appl. No.: 283,572

[22] Filed: Dec. 13, 1988

[30] Foreign Application Priority Data

Dec. 22, 1987 [IT] Italy ................... 23155 A/87

[51] Int. Cl.⁵ .................... G01N 23/04; C09K 11/46
[52] U.S. Cl. .................... 250/484.1; 252/301.4 F
[58] Field of Search ........... 250/484.1 B, 327.2 A; 252/301.4 F, 301.4 H

[56] References Cited

U.S. PATENT DOCUMENTS

| | | | |
|---|---|---|---|
| 3,859,527 | 1/1975 | Luckey | 250/327.2 |
| 4,220,551 | 9/1980 | Fouassier et al. | 252/301.4 F |
| 4,258,264 | 3/1981 | Kotera et al. | 250/484.1 |
| 4,261,854 | 4/1981 | Kotera et al. | 250/327.2 |
| 4,689,278 | 8/1987 | Umemoto et al. | 252/301.4 H |

FOREIGN PATENT DOCUMENTS

| | | |
|---|---|---|
| 0107192 | 5/1984 | European Pat. Off. . |
| 0111893 | 6/1984 | European Pat. Off. . |
| 0159726 | 10/1985 | European Pat. Off. . |
| 0058556 | 2/1974 | Japan ............ 252/301.4 F |

*Primary Examiner*—Janice A. Howell
*Assistant Examiner*—Richard Hanig
*Attorney, Agent, or Firm*—Gary L. Griswold; Walter N. Kirn; Mark A. Litman

[57] ABSTRACT

A method for recording and reproducing a radiation image comprising the steps of (i) causing a visible radiation stimulable phosphor to absorb a high-energy radiation passing through an object, (ii) stimulating said phosphor with visible radiation to release the stored energy as fluorescent light and (iii) detecting said fluorescent light with light detecting means, is characterized by the fact that the photostimulable phosphor is selected within the group of divalent europium activated alkali earth metal halosilicates.

Apparatus for recording and reproducing a radiation image using the above described method.

Panel for storing a radiation image containing the above described photostimulable phosphors.

Phosphors selected within the group of alkali earth metal halosilicates activated with divalent europium in the presence of Al and/or Ga and/or Na and/or K.

10 Claims, No Drawings

METHOD FOR RECORDING AND REPRODUCING A RADIATION IMAGE, APPARATUS USING SAID METHOD, PANEL FOR STORING A RADIATION IMAGE AND PHOTOSTIMULABLE PHOSPHORS

FIELD OF THE INVENTION

This invention refers to a method for recording and reproducing a radiation image by causing a visible radiation stimulable phosphor to absorb high-energy radiation passing through an object, stimulating said phosphor to release the stored energy as fluorescent light and detecting said fluorescent light, the photostimulable phosphor being selected within the group of divalent europium activated alkali earth metal halosilicates.

BACKGROUND OF THE ART

U.S. Pat. No. 3,859,527 describes a method for recording and reproducing a high-energy radiation image using a panel for storing a radiation image comprising a stimulable phosphor which emits light when stimulated with visible or infrared radiations after exposure to such radiation (wherein high-energy radiation means an electromagnetic wave or corpuscular radiation such as X-rays, $\alpha$-rays, $\beta$-rays, gamma-rays, neutrons, ultraviolet rays, or the like).

U.S. Pat. No. 4,258,264 describes a method and apparatus for reproducing a radiation image by stimulating a storing phosphor with stimulating rays, the wavelengths of which are in the range from 600 to 700 nm, and detecting the stimulated light by means of a light detector, the detected light being in the range from 300 to 500 nm.

European patent application Ser. No. 159,726 describes an alkali earth metal halide phosphor activated with divalent europium having the formula:

$$M''X_2 \cdot aM''X'_2 \cdot bA : xEu^{2+}$$

wherein M'' is at least one alkali earth metal selected within the group consisting of Ba, Sr and Ca; both X and X' are at least a halogen selected within the group consisting of Cl, Br and I, X being different from X'; A is at least one oxide selected within the group consisting of $SiO_2$ and $P_2O_5$; a, b and x are numbers respectively satisfying the conditions $0.1 \leq a \leq 10$; $10^{-4} \leq b \leq 0.2$ and $0 < x \leq 0.2$. In the above mentioned patent application there are also described a method for recording and reproducing a radiation image using said phosphor and a radiation image storing panel using such phosphor. The radiations stimulating said phosphor preferably have a wavelength in the range from 500 to 800 nm.

European patent application Ser. No. 107,192 describes a method for recording and reproducing a radiation image comprising the steps of (i) causing a stimulable phosphor to absorb radiation passing through an object, (ii) exposing said stimulable phosphor to an electromagnetic wave having a wavelength in the range from 450 to 800 nm to release the stored radiation energy as fluorescent light and (iii) detecting said fluorescent light, wherein said stimulable phosphor is a divalent europium activated complex halide having the formula:

$$M''FX \cdot aM'X' \cdot bM''' X''_2 \cdot cM''' X'''_3 \cdot xA : yEu^{2+}$$

wherein M'' is at least an alkali earth metal selected within the group consisting of Ba, Sr and Ca; M' is am alkali metal selected within the group consisting of Li, Na, K, Rb and Cs; M''' is at least a trivalent metal selected within the group consisting of Al, Ga, In and Tl; A is at least a metal oxide; X is at least a halogen selected within the group consisting of Cl, Br and I; each of X', X'' and X''' are at least a halogen selected within the group consisting of Cl, Br and I; a, b and c are numbers respectively satisfying the conditions $0 \leq a \leq 2$; $0 \leq b \leq 0.01$; $0 \leq c \leq 0.01$ and $a + b + c \geq 10^{-6}$; x and y are numbers respectively satisfying the conditions $0 < x \leq 0.5$ and $0 < y \leq 0.2$. Such patent application describes also a radiation image storing panel used for such a method.

The phosphors described in the above cited European patent applications Ser. No. 159,726 and 107,192 give the best results, with respect to the emission efficiency, when they are stimulated with radiation having a wavelength in the range from 600 to 700 nm, in particular when they are stimulated with a He-Ne 633 nm laser beam. Such phosphors do not give such good results when they are stimulated with a radiation having a wavelength lower than 600 nm.

European patent application Ser. No. 111,893 describes a method for recording and reproducing a radiation image comprising the steps of (i) causing a radiation image storing panel to absorb a radiation passing through an object, such a panel containing a divalent europium activated barium fluorochloride phosphor, (ii) exposing said panel to an electromagnetic wave having a wavelength in the range from 400 to 550 nm to release the stored radiation energy as fluorescent light and (iii) detecting said fluorescent light.

SUMMARY OF THE INVENTION

Useful phosphors to be used in panels, apparatus and methods for recording and reproducing a high-energy radiation image, including the steps of stimulating a phosphor image-wise exposed to a radiation and detecting the fluorescent light emitted by said phosphor upon stimulation, were found to be those characterized by being divalent europium activated alkali earth metal halosilicates.

DETAILED DESCRIPTION OF THE INVENTION

The present invention refers to a method for recording and reproducing a radiation image comprising the steps of (i) causing a visible radiation stimulable phosphor to absorb a high-energy radiation passing through an object, (ii) stimulating said phosphor with visible radiation to release the stored energy as fluorescent light and (iii) detecting said fluorescent light with light detecting means, said method being characterized by the fact that said phosphor is selected within the group of divalent europium activated alkali earth metal halosilicates.

As used in the present invention the term "alkali earth metal halosilicates" refers to compounds of general formula:

$$Me^{2+}_5 SiO_4 X_6$$

Preferably, the present invention refers to a method as described above wherein said phosphor is represented by the formula:

$$Me^{2+}_5 \cdot SiO_4 X_6 \cdot mMe^{1+} \cdot nMe^{3+} : aEu^{2+} \quad (1)$$

wherein $Me^{2+}$ is at least one among Sr, Ca and Ba; $Me^{1+}$ is Na or K; $Me^{3+}$ is Al or Ga; X is at least one among Cl and Br; $0 < a \leq 0.1$; $0 \leq m \leq 0.1$ and $0 \leq n \leq 0.1$.

More preferably, the present invention refers to a method as described above wherein said phosphor is represented by the formula:

$$Me^{2+}{}_5 \cdot SiO_4 X_6 \cdot mMe^{1+} \cdot nMe^{3+} : aEu^{2+} \qquad (2)$$

wherein $Me^{2+}$ is at least one among Sr, Ca and Ba; $Me^{1+}$ is Na or K; $Me^{3+}$ is Al or Ga; X is at least one among Cl and Br; $0 < a \leq 0.1$; $0 \leq m \leq 0.1$ and $0 < n \leq 0.1$.

In another more preferred aspect, the present invention refers to a method as described above wherein said phosphor is represented by the formula:

$$Me^{2+}{}_5 \cdot SiO_4 X_6 \cdot mMe^{1+} \cdot nMe^{3+} : aEu^{2+} \qquad (3)$$

wherein $Me^{2+}$ is at least one among Sr, Ca and Ba; $Me^{1+}$ is Na or K; $Me^{3+}$ is Al or Ga; X is at least one among Cl and Br; $0 < a \leq 0.1$; $0 < m \leq 0.1$ and $0 \leq n \leq 0.1$.

Within the phosphors of the present invention, above all those represented by formulas (1), (2) and (3) above, $X_6$ is preferred to include at least one Br atom and at least one Cl atom, as better described by formula $Cl_x Br_{6-x}$, where x ranges from 1 to 5, preferably from 3 to 5. Preferably, together with Cl and Br (represented by X in formulas (1), (2) and (3) above), there are used at the same time higher quantities of divalent europium as dopant within the above considered range, especially comprised between 0.04 and 0.1. Such Cl and Br combination is believed to be capable of improving the performance of the phosphors of the present invention even in the presence of Al and/or Ga and/or Na and/or K.

In particular, the present invention refers to the method described above where the wavelength of said stimulating radiation is in the range from 480 to 700 nm.

More in particular, the present invention refers to the method described above where the wavelength of said stimulating radiation is in the range from 500 to 600 nm, preferably from 500 to 550 nm, more preferably is about 510 to 520 nm and most preferably about 514.5 nm corresponding to the emission of an Argon laser apparatus.

In another aspect, the present invention refers to an apparatus for recording and reproducing a radiation image comprising (1) means for causing a visible radiation stimulable phosphor to absorb highenergy radiation passing through an object, (ii) means for stimulating said phosphor with visible radiation to release the stored energy as fluorescent light and (iii) means for detecting said fluorescent light, said apparatus being characterized by the fact that said phosphor is selected within the group of divalent europium activated alkali earth metal halosilicates, in particular represented by formulas (1), (2) and (3) above.

In a further aspect, the present invention refers to a high-energy radiation image storing panel which is provided with a fluorescent layer comprising a binder and a photostimulable phosphor dispersed in said binder, wherein said photostimulable phosphor is selected within the group of divalent europium activated alkali earth metal halosilicates, in particular represented by formulas (1), (2) and (3) above.

In a still further aspect, the present invention refers to a photostimulable phosphor selected within the group of divalent europium activated alkali earth metal halosilicates corresponding to formulas (2) or (3) above.

The method and apparatus for recording and reproducing a high-energy radiation image using a radiation image storing panel of the present invention schematically comprise: a high-energy radiation source, an object, a radiation image storing panel, a light source emitting stimulating radiations which stimulate the fluorescent layer of the panel to release the stored radiation energy as fluorescent light, a filter to absorb the radiations emitted by the light source and reflected by the panel and transmit only the fluorescent light emitted by the panel and a focusing lens to collect the light emitted by the panel and passed through the filter. The combination of a photodetector with a photomultiplier is used to detect and convert the light emitted by the panel into electrical signals, the electrical signal being amplified by means of an amplifier and such amplified electrical signal being evaluated with a data analyzer.

Means to cause a visible radiation stimulable phosphor to absorb a high-energy radiation passing through an object are known in the art, as described in U.S. Pat. No. 4,239,968. They include the high-energy radiation source (such as e.g. an x-ray tube) and a radiation image storing panel similar to that of the present invention including a phosphor different from that of the present invention. When the phosphor is exposed to x-rays, the radiation passes through the object. The intensity of the radiation passed through the object represents the transmittance factor of the object. Furthermore, an image representing the transmittance pattern of the object is obtained by means of a radiation impinging onto the panel. The radiation is absorbed by the fluorescent layer of the panel and electrons or holes are generated in the fluorescent layer proportionally to the quantity of the absorbed radiation. The electrons or holes are stored in the traps of the divalent europium activated alkali earth metal halosilicate phosphors of the present invention.

The radiation image stored in the panel is displayed upon stimulation with a stimulating radiation beam. It is known in the art that the means for stimulating said panel with visible radiation include stimulating radiation source means emitting in the visible field, such as for instance, an Argon laser emitting a 514.5 nm laser beam, as described in European patent application Ser. No. 111,893. A scanning apparatus allows the fluorescent layer of the panel to be scanned with stimulating radiation emitted by a light source, as described in U.S. Pat. No. 4,258,264. Focusing means allow said stimulating light to be focused onto the panel in a small spot (e.g. 0.7 mm²), as described in U.S. Pat. No. 4,258,264. The electrons or holes stored in the traps of the photostimulable phosphors contained in the panel are expelled therefrom and the radiation image stored in the panel is released as fluorescent light. The luminescence of the fluorescent light emitted by the panel is proportional to the number of electrons or holes stored in the fluorescent layer of the panel and, therefore, to the amount of radiation absorbed therein.

It is known in the art that means for detecting said fluorescent light emitted by the panel include: (a) interference filters, the transmission peak of which is tuned with the wavelength of the signal emitted by the sample, to filter the unwanted stimulating light (such as e.g. a Schott BG1 filter); (b) optical means to collect the light emitted by the panel such as for instance light guiding means having a linear or arched end portion to be placed adjacent to a scanning line of the photostimulable phosphor to receive and guide the light emitted by the phosphor and an annular end portion to be placed adjacent to the surface of the light detector which receives the light, as described in U.S. Pat. No. 4,346,295. Optical means useful to collect the light emitted by the panel are in particular represented by elliptical mirrors having their concave side turned towards the panel and having an opening for the passage of such stimulating radiation, as described in European patent application Ser. No. 210,505; (c) the combination of a photosensor and a photomultiplier to detect the fluorescent light and convert it into electrical signals (such as for instance a Thorn Emi 9558 QB photomultiplier); (d) means to amplify the signal (such as for example an EG&G Parc Model 181 amplifier) and (e) evaluation means to evaluate the obtained electrical signal (corresponding to the original high-energy radiation image), such as for example a data analyzer apparatus.

According to the present invention, the controlled addition of Na, K, Al and/or Ga according to the above reported formulas was found to facilitate the formation of anionic vacancies in the alkali earth metal halosilicate phosphor matrix. Such anionic vacancies are thought to be the cause of the storing capability of such phosphors.

More in particular, the luminescence of the fluorescent light emitted by the stimulable phosphor selected within the group of the divalent europium activated alkali earth metal halosilicate phosphors of the present invention was found to be higher when such phosphors were stimulated with a stimulating radiation having a wavelength in the range from 500 to 600 nm, such as for example an Argon laser having a wavelength of 514.5 nm.

When according to the present invention the phosphors (of the present invention) are stimulated with stimulating radiation having a wavelength in the range from 500 to 600 nm and the emitted fluorescent light is detected with a wavelength of about 450 nm, in the range from 420 to 480 nm, it is useful to use a filter which allows the reflected stimulating light to be separated from the light emitted by the panel containing such phosphors. To this purpose it is necessary to use filters absorbing the light having a wavelength higher than 480 nm, thus allowing the detecting means of the fluorescent light emitted by the phosphors to be reached only by the light having a wavelength lower than 480 nm, leaving apart the reflected stimulating light.

According to the present invention, the above described divalent europium activated alkali earth metal halosilicate phosphors are treated thermally. Such thermal treatment includes a repeating operation cycle which comprises: (a) heating at a temperature in the range from 100 to 1000° C., (b) cooling to room temperature and (c) homogenizing upon mild grinding before letting the phosphors cool definitively under nitrogen stream.

The panels of the present invention normally comprise a fluorescent layer including a binder and, dispersed therein, at least one phosphor selected within the group of the above said divalent europium activated alkali earth metal halosilicates of the present invention. The fluorescent layer is formed by dispersing the phosphor in the binder to prepare a coating dispersion and then coating the coating dispersion according to conventional coating methods to form a uniform layer. Although the fluorescent layer itself can be a radiation image storing panel if the fluorescent layer is self-supporting, to form a radiation image storing panel the fluorescent layer generally consists of a support base. Moreover, the surface of the fluorescent layer is in general overcoated with a protective layer for physically and chemically protecting the fluorescent layer itself. Furthermore, a sub-layer can be coated between the fluorescent layer and the support base for strictly binding them together.

The binders used in the fluorescent layer of the radiation image storing panel of the present invention may be those commonly used for the formation of layers, such as gum arabic, proteins like gelatin, polysaccharides like dextrane, organic polymeric binders like vinylbutyrale, polyvinylacetate, nitrocellulose, ethylcellulose, vinylidenechloride-vinylchloride copolymers, polymethylmethacrylate, polybutylmethacrylate, vinylchloride-vinylacetate copolymers, polyurethane, cellulose acetate-butyrate, polyvinyl alcohol, and the like.

In general, the binder is used in a quantity ranging from 0.01 to 1 part by weight per each part by weight of phosphor. However, with respect to sensitivity and sharpness of the obtained panel, the binder quantity should preferably be small. Consequently, under consideration of the sensitivity and sharpness of the panel and of the easiness of use of the coating dispersion, the binder is preferably used in a quantity ranging from 0.03 to 0.2 parts by weight per each part by weight of the stimulable phosphor. The thickness of the fluorescent layer is generally comprised in the range from 10 $\mu$ to 1 mm.

In the radiation image storing panel of the present invention, the fluorescent layer is generally coated on a support base. As a base there can be employed various materials such as polymeric materials, glass, wool, cotton, paper, metal and the like. From the point of view of the use of the panel as information recording means, the support shall preferably be treated in the form of a flexible sheet or roll. To this purpose, the preferred support base is an organic polymeric film such as a cellulose acetate, polyester, polyethyleneterephthalate, polyamide, triacetate, polycarbonate film, or the like or normal paper or treated paper, such as photographic paper, barytha-coated paper, resin-coated paper, pigment containing paper such as titannium dioxide, or the like. On one side (that coated with the fluorescent layer) the support base can be provided with a sublayer for closely binding the fluorescent layer. The sub-layer material may be any conventional adhesive material. In the coating operation of the fluorescent layer onto the support base or sub-layer, a coating composition comprising the phosphor dispersed in a binder can be applied directly to the support base or to a sub-layer to form the fluorescent layer. Alternatively, a fluorescent layer formed beforehand may be bound to the support base or sub-layer. When the used support base is permeable to the phosphor stimulating radiations, the radiation image storing panel can be exposed to the stimulating radiations at the base side.

Furthermore, in the radiation image storing panel of the present invention, on the surface of the fluorescent layer on the exposure side (i.e. that opposite to the support base) there is applied in general a protective layer in order to give the fluorescent layer a chemical and physical protection. If, as said above, the fluorescent layer is self-supporting, the protective layer can be coated on both surfaces of the fluorescent layer. The protective layer can be coated onto the fluorescent layer by directly applying a coating dispersion to form the protective layer or binding thereto the protective layer formed beforehand. As a material for the protective layer, a conventional material for protective layers can be used, such as nitrocellulose, ethylcellulose, cellulose acetate, polyester, polyethyleneterephthalate, and the like.

The radiation image storing panel of the present invention can be colored with a dye. Furthermore, the fluorescent layer on the radiation image storing panel of the present invention can contain a white powder dispersed therein. By using a dye or a white powder, a radiation image storing panel giving a very sharp image can be obtained.

The present invention is now illustrated with more details by making reference to the following examples.

EXAMPLE 1

Preparation of $Sr_5SiO_4Cl_6:0.05Eu^{2+}$ phosphor (Compound no. 1 of following Table 1)

A mixture consisting of 38.28 g of $SrCO_3$, 106.64 g of $SrCl_2 \cdot 6H_2O$, 8 g of $SiO_2$ and 1.17 g of $Eu_2O_3$ was prepared and kept at 150° C., under nitrogen stream, for 5 hours and at 500° C. for other 5 hours. After cooling, the mixture was homogenized by means of mild grinding, brought to 750° C. under inert gas stream for 5 hours and cooled. The mixture was again homogenized and then brought to 750° C. under reducing atmosphere ($Ar + 10\%$ $H_2$) for 5 hours. The obtained phosphor was left to cool under a nitrogen stream.

EXAMPLE 2

Preparation of $Sr_5SiO_4Cl_6 \cdot 0.01Al:0.05Eu^{2+}$ phosphor (Compound no. 4 of following Table 1)

A mixture consisting of 38.38 g of $SrCO_3$, 106.16 g of $SrCl_2 \cdot 6H_2O$, 7.91 g of $SiO_2$, 0.07 g of $Al_2O_3$ and 1.17 g of $Eu_2O_3$ was prepared and then treated as described in Example 1.

EXAMPLE 3

Preparation of $Sr_5SiO_4Cl_6 \cdot 0.01Na:0.050Eu^{2+}$ phosphor (Compound no. 6 of following Table 1)

A mixture like that described in Example 1 was prepared with the addition of 0.77 g of NaCl. The mixture was kept at 150° C. under nitrogen stream for 5 hours and then at 500° C. for other 5 hours. After cooling, the mixture was homogenized by means of mild grinding, brought to a temperature of 650° C. under an inert gas stream for 15 hours and cooled. The mixture was again homogenized and then brought to 670° C. under a reducing atmosphere ($Ar + 10\%$ $H_2$) for 15 hours. The obtained phosphor was then left to cool under a nitrogen stream.

EXAMPLE 4

Preparation of $Sr_5SiO_4Cl_5Br:0.05Eu^{2+}$ phosphor (Compound no. 10 of following Table 1)

A mixture consisting of 38.28 g of $SrCO_3$, 88.87 g of $SrCl_2 \cdot 6H_2O$, 23.64 g of $SrBr_2 \cdot 6H_2O$, 8 g of $SiO_2$ and 1.17 g of $Eu_2O_3$ was prepared and then treated as described in Example 3.

EXAMPLE 5

Other preparation of the phosphor of Example 4. A mixture consisting of 26.87 g of SrO, 52.71 g of $SrCl_2$, 16.45 g of $SrBr_2$, 8 g of $SiO_2$ and 1.17 g of $Eu_2O_3$ was prepared and then treated as described in Example 3.

Compounds nos. 2, 3, 5, 7, 8, 9, 11, 12 and 13 of following Table 1 were prepared with the same preparation techniques described in Examples 1 to 5.

EXAMPLE 6

Phosphor samples (Compounds 1 to 13 of following Table 1) obtained with the preparations described in Examples 1 to 5 were for 10 seconds exposed to 40 KVp and 10 mA x-rays filtered with 1 mm Be. After 2 minutes such samples were stimulated for 2 seconds with a 514.5 nm wavelength light beam emitted by a QJ 100W 12V lamp and passed through a 03 FIL 004 narrow band filter (8 mm opening) of Schott/Melks Griot, having a 68% transmittance, placed between the light source and the sample. The intensity of the stimulating light was measured with a photometer (Mod. 450-1 Photometer of EG&G, Elettrooptics), connected with an attenuator (Mod. 550-11 of the same firm). The photostimulated light emitted by the phosphor was collected with a photomultiplier (Thorn-Emi QB type) and converted into electrical signals, while the unwanted stimulating light reflected by the phosphor was absorbed by a collecting filter (Schott BG-1 with 8.5 mm opening). Such filter is capable of transmitting the radiations having a wavelength between 270 and 500 nm (transmitting at least 90% of the signal between 270 and 480 nm) and preventing the passage of the radiations having a wavelength between 500 and 770 nm. The electrical signal was amplified by means of a combination of a EG&G Parc Model 181 type preamplifier and a EG&G Parc Model 113 type amplifier. The signal was then evaluated with a Data Precision 6000 type data analyzer of Division Analogic Corp.

The following Table 1 reports the emission values of the photostimulated light emitted by the phosphors prepared according to Examples 1 to 5 and treated as described in Example 6.

TABLE 1

| Comp. | Host | $Eu^{2+}$ | Dopants | Emission Efficiency |
|---|---|---|---|---|
| 1. | $Sr_5SiO_4Cl_6$ | 0.050 | — | 100 |
| 2. | $Sr_5SiO_4Cl_6$ | 0.025 | — | 36 |
| 3. | $Sr_5SiO_4Cl_6$ | 0.075 | — | 48 |
| 4. | $Sr_5SiO_4Cl_6$ | 0.050 | 0.01 Al | 120 |
| 5. | $Sr_5SiO_4Cl_6$ | 0.050 | 0.01 K | 150 |
| 6. | $Sr_5SiO_4Cl_6$ | 0.050 | 0.01 Na | 213 |
| 7. | $Sr_5SiO_4Cl_6$ | 0.050 | 0.01 B | 66 |
| 8. | $Sr_5SiO_4Cl_5Br$ | 0.005 | — | 10 |
| 9. | $Sr_5SiO_4Cl_5Br$ | 0.025 | — | 60 |
| 10. | $Sr_5SiO_4Cl_5Br$ | 0.050 | — | 390 |
| 11. | $Sr_5SiO_4Cl_5Br$ | 0.075 | — | 300 |
| 12. | $Sr_5SiO_4Cl_5Br_2$ | 0.050 | — | 200 |
| 13. | $Sr_5SiO_4Cl_5Br_3$ | 0.050 | — | 350 |

The emission efficiency value of the phosphor of the present invention shown as no. 1 of Table 1 was placed equal to 100 to favor the comparison with the emission values of the other compounds of the present invention (Compounds nos. 2 to 13). The data of Table 1 show that a substantial improvement was obtained with the addition of Al, K or Na (Compounds nos. 4 to 6) to the phosphor matrix indicated as Compound no. 1 (Ga is thought to behave like Al). On the other side, a worsening of the emission efficiency was obtained with the addition of B (Compound no. 7). In particular, as already indicated, a remarkable improvement in the emission efficiency was obtained when one or more chlorine atoms of the phosphor matrix of the present invention had been substituted with bromine atoms (Compounds 10 to 13), in the presence of a sufficient divalent europium quantity (at least 0.040); compounds nos. 8 and 9 activated with divalent europium quantities lower than 0.040 gave worse results than Compound no. 1.

The following Table 2 shows the emission efficiency of Compounds 1, 10 and 13, indicated in Table 1, with respect to different wavelengths of the stimulating radiations.

TABLE 2

| Comp. | Host | $Eu^{2+}$ | Emission Efficiency | | | |
|---|---|---|---|---|---|---|
| | | | 514.5 | 600 | 700 | 756 nm |
| 1. | $Sr_5SiO_4Cl_6$ | 0.050 | 100 | 25 | 4.0 | 1.3 |
| 10. | $Sr_5SiO_4Cl_5Br$ | 0.050 | 390 | 81 | 7.2 | 2.5 |
| 13. | $Sr_5SiO_4Cl_3Br_3$ | 0.050 | 350 | 75 | 7.0 | 3.1 |

As it can be noted, the highest emission efficiency can be obtained with stimulating radiation having a wavelength slightly higher than 500 nm (514.5 nm Argon laser beam); such an efficiency decreases as the wavelengths of the stimulating radiation increase. In fact, when such wavelengths are about 600 nm, the phosphor efficiency is about 20–25% of the efficiency of the same phosphor stimulated at 514.5 nm. When the phosphor is stimulated at about 700 nm, the emission efficiency decreases to about 2–4% with respect to the efficiency of the same phosphor stimulated at 514.5 nm. When the phosphor is stimulated with stimulating radiation having a wavelength higher than 700 nm, the emission efficiency of the phosphor is such that its emission cannot be collected by the light detecting means of the present invention.

The ratio of light emission of Compound 13 stimulated at 514.5 nm and the phosphor BaFCl:0.001Eu (Phosphor no. 3 of U.S. Pat. No. 4,239,968) stimulated at 633 nm (He-Ne laser beam) resulted 1.28.

The emission curves of the phosphors of the present invention have an emission peak at about 450 nm; the shape of such curves is very narrow (about 80% of the signal is emitted between 420 and 480 nm).

The evaluation of the signal emitted by the phosphors required the use of means (Schott BG-1 filter with 8.5 mm opening and Thorn-Emi 9635 QB photodetector) which collected only such a signal and not the signal given by the stimulating radiation reflected by the phosphor.

We claim:

1. A method for recording and reproducing a radiation image comprising the steps of (i) causing a visible radiation stimulable phosphor to absorb a high-energy radiation passing through an object, (ii) stimulating said phosphor with visible radiation to release the stored energy as fluorescent light and (iii) detecting said fluorescent light with light detecting means, characterized by the fact that said phosphor is a divalent europium activated alkali earth metal halosilicate represented by the formula:

$$Me^{2+}{}_5 \cdot SiO_4X_6 \cdot mMe^{1+} \cdot nMe^{3+} : aEu^{2+}$$

wherein $Me^{2+}$ is at least one among Sr, Ca and Ba; $Me^{1+}$ is Na or K; $Me^{3+}$ is Al or Ga; X is at least one of Cl or Br; $0 < a \leq 0.1$; $0 \leq m \leq 0.1$ and $0 \leq n \leq 0.1$.

2. The method for recording and reproducing a radiation image as defined in claim 1, where said phosphor is stimulated by a radiation having a wavelength in the range from 480 to 700 nm.

3. The method for recording and reproducing a radiation image as defined in claim 2, where said phosphor is stimulated by a radiation having a wavelength in the range from 500 to 600 nm.

4. The method for recording and reproducing a radiation image as defined in claim 2, where said phosphor is stimulated by a radiation having a wavelength in the range from 500 to 550 nm.

5. The method for recording and reproducing a radiation image as defined in claim 1, where said fluorescent light detecting means comprise filters absorbing radiation having a wavelength higher than 480 nm and detect radiation having a wavelength lower than 480 nm.

6. An improved apparatus for recording and reproducing a radiation image comprising (i) means for causing a visible radiation stimulable phosphor to absorb a high-energy radiation passing through an object, (ii) means for stimulating said phosphor with visible radiation to release the stored energy as fluorescent light and (iii) means for detecting said fluorescent light, said apparatus being characterized by the fact that said phosphor is a divalent europium activated substituted alkali earth metal halosilicate represented by the formula:

$$Me^{2+}{}_5 \cdot SiO_4X_6 \cdot mMe^{1+} \cdot nMe^{3+} : aEu^{2+}$$

wherein $Me^{2+}$ is at least one among Sr, Ca and Ba; $Me^{1+}$ is Na or K; $Me^{3+}$ is Al or Ga; X is at least one of Cl or Br; $0 < a \leq 0.1$; $0 \leq m \leq 0.1$ and $0 \leq n \leq 0.1$.

7. The apparatus for recording and reproducing a radiation image as defined in claim 6, wherein said phosphor is stimulated by a radiation having a wavelength in the range from 480 to 700 nm.

8. A radiation image storing panel having a fluorescent layer comprising a binder and a stimulable phosphor dispersed therein, characterized by the fact that said phosphor is a divalent europium activated substituted alkali earth metal halosilicate represented by the formula:

$$Me^{2+}{}_5 \cdot SiO_4X_6 \cdot mMe^{1+} \cdot nMe^{3+} : aEu^{2+}$$

wherein $Me^{2+}$ is at least one among Sr, Ca and Ba; $Me^{1+}$ is Na or K; $Me^{3+}$ is Al or Ga; X is at least one of Cl or Br; $0 < a \leq 0.1$; $0 \leq m \leq 0.1$ and $0 \leq n \leq 0.1$.

9. A photostimulable phosphor represented by the formula:

$$Me^{2+}{}_5 \cdot SiO_4X_6 \cdot mMe^{1+} \cdot nMe^{3+} : aEu^{2+}$$

wherein $Me^{2+}$ is at least one among Sr, Ca and Ba; $Me^{1+}$ is Na or K; $Me^{3+}$ is Al or Ga; X is at least one of Cl or Br; $0 < a \leq 0.1$; $0 \leq m \leq 0.1$ and $0 < n \leq 0.1$.

10. A photostimulable phosphor represented by the formula:

$$Me^{2+}{}_5 \cdot SiO_4X_6 \cdot mMe^{1+} \cdot nMe^{3+} : aEu^{2+}$$

wherein $Me^{2+}$ is at least one among Sr, Ca and Ba; $Me^{1+}$ is Na or K; $Me^{3+}$ is Al or Ga; X is at least one of Cl or Br; $0 < a \leq 0.1$; $0 < m \leq 0.1$ and $0 \leq n \leq 0.1$.

* * * * *